(12) United States Patent
Rankin et al.

(10) Patent No.: US 7,777,667 B1
(45) Date of Patent: Aug. 17, 2010

(54) RADAR TARGET IDENTIFICATION APPARATUS

(75) Inventors: Peter M. Rankin, Syracuse, NY (US); Zenn Zenon, Syracuse, NY (US)

(73) Assignee: The United States of America as represented by the Department of the Air Force, Washington, DC (US)

( * ) Notice: Subject to any disclaimer, the term of this patent is extended or adjusted under 35 U.S.C. 154(b) by 0 days.

(21) Appl. No.: 06/101,401

(22) Filed: Dec. 5, 1979

(51) Int. Cl.
*G01S 13/78* (2006.01)
(52) U.S. Cl. .............................. 342/45; 342/42; 342/51
(58) Field of Classification Search ................. 343/6 R, 343/6.8 R, 6.8 LC; 342/42, 44, 45, 51, 90, 342/131, 132, 134, 135
See application file for complete search history.

(56) References Cited

U.S. PATENT DOCUMENTS

| | | | | | |
|---|---|---|---|---|---|
| 3,824,592 | A | * | 7/1974 | Mehltretter | .................. 342/128 |
| 3,874,296 | A | * | 4/1975 | Hedemark | .................... 102/214 |
| 3,881,177 | A | * | 4/1975 | Len et al. | ........................ 342/16 |
| 3,906,496 | A | * | 9/1975 | Goodrich | ..................... 342/132 |
| 4,042,925 | A | * | 8/1977 | Albanese et al. | ............. 342/132 |
| 4,068,232 | A | * | 1/1978 | Meyers et al. | .................. 342/44 |
| 4,241,347 | A | * | 12/1980 | Albanese et al. | .............. 342/89 |

* cited by examiner

*Primary Examiner*—John B Sotomayor
(74) *Attorney, Agent, or Firm*—AFMCLO/JAZ; William Stepanishen

(57) ABSTRACT

A radar target identification apparatus utilizing a pseudo-random digital code to modulate a target's return signal to include a two-dimensional range and cross range Doppler-coded return with a target's skin return and thereby identify friendly targets to the interrogating radar unit.

5 Claims, 1 Drawing Sheet

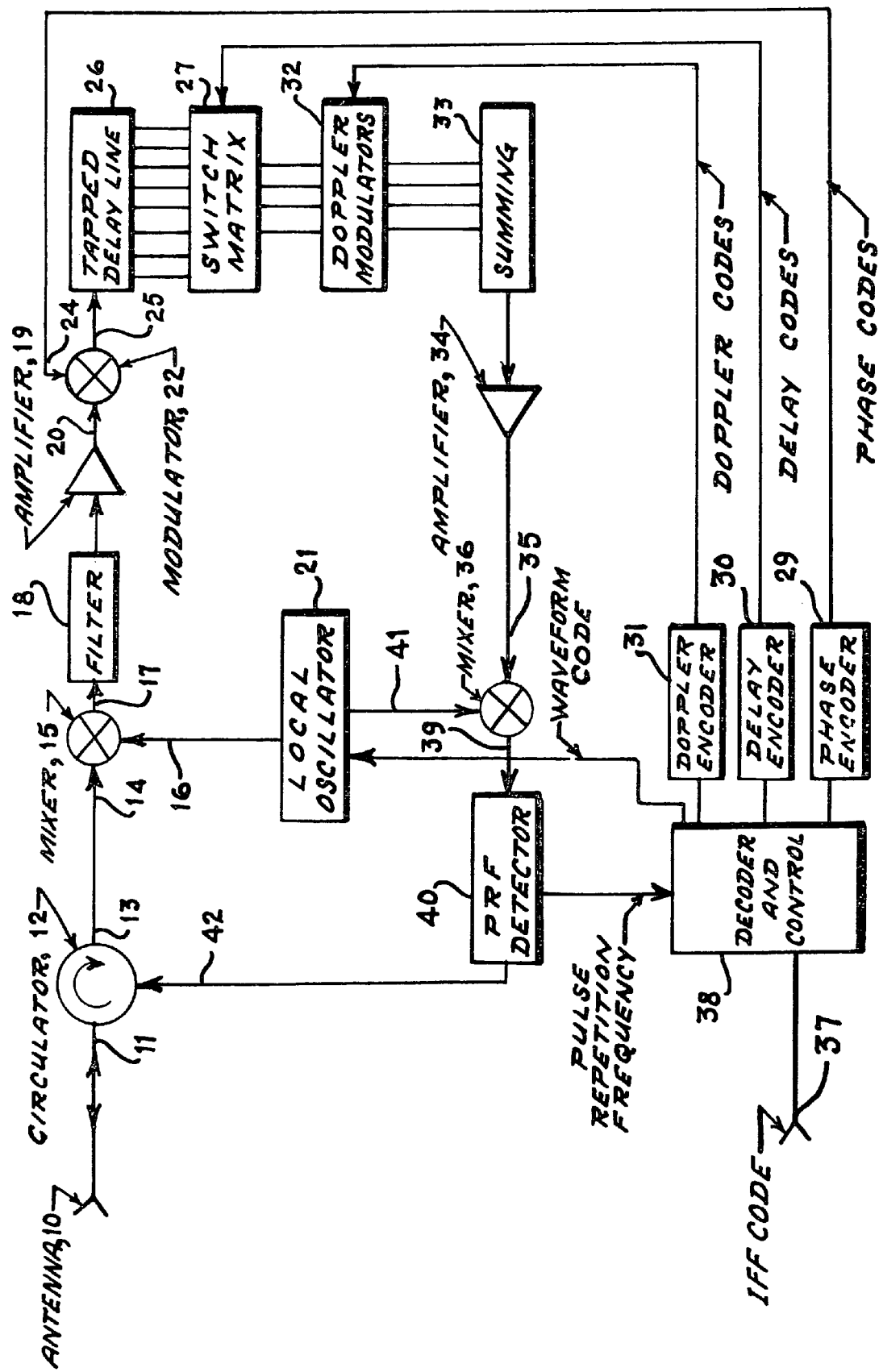

RADAR TARGET IDENTIFICATION APPARATUS

STATEMENT OF GOVERNMENT INTEREST

The invention described herein may be manufactured and used by or for the Government for governmental purposes without the payment of any royalty thereon.

BACKGROUND OF THE INVENTION

This invention pertains generally to radar systems and, in particular, to a radar target identification apparatus.

There has always been a need for day/night, all-weather surveillance of designated areas to locate and identify objects therein such as aircraft, ships, satellites, and to distinguish between friend or foe. In meeting such a need, especially during periods of poor visibility, it is a common military technique to employ radar to detect moving targets. A skilled radar observer can classify moving targets according to speed, distance and bearing, however, the radar observer is unable to distinguish between moving targets as friendly or hostile since the radar echoes, or signature, from either friend or foe may be identical. Consequently, radar observation alone serves merely to alert the observer to the fact that a moving target is located at a certain point within the zone of observation.

It is therefore necessary that some form of the classic, challenge and reply be utilized to establish target identification. It is easy to furnish an aircraft or the like with a radio-receiver with which communication can be established between friendly forces when the craft enters the zone monitored by a friendly radar. The difficulty that is encountered is that it is more difficult for the craft to identify itself without disclosing its position or any other critical information to hostile forces. Furthermore, any equipment used as a means of identification between friendly elements must not compromise the security of either element. In order to achieve this end, the friendly element entering the field of a surveillance radar must be provided with some means of determining, without revealing the element's position, when penetration of the friendly radar field occurs. Further, since equipment issued to such friendly craft is often subject to capture by hostile forces, any identification means must be immune to compromise. Therefore, the employment of a fully-automatic identification friend or foe system is completely unacceptable since hostile forces using a captured automatic unit could penetrate a surveillance zone which is being surveyed by friendly forces. The system design must therefore provide some method whereby the authentic possessor of an identification, friend or foe (IFF) unit can transmit a unique identification.

SUMMARY OF THE INVENTION

The present invention utilizes a small, low power response coding apparatus which is carried in the friendly vehicle that adds a two-dimensional range and cross range Doppler coded return to the vehicle's skin return when interrogated by a friendly radar. The radar signals are received by the friendly vehicle and are demodulated. The resultant low frequency signal is modulated by a pseudo-random digital code which is selected by a switch matrix according to a code from a delay encoder. A Doppler modulator individually cross range codes the output which is mixed with signals from the local oscillator. A pulse repetition frequency detector is used to synchronize the output signal to the radar pulse repetition frequency. The output is connected to the antenna for transmission back to the interrogating friendly radar.

It is one object of the invention, therefore, to provide an improved radar target identification apparatus.

It is another object of the invention to provide an improved radar target identification apparatus that inserts a coded return signal to the vehicle radar echo signal.

It is still another object of the invention to provide an improved radar target identification apparatus which is operating at the same frequency as the illuminating radar and utilizes an image/Doppler window in which to provide a proper response.

These and other advantages, objects and features of the invention will become more apparent after considering the following description taken in conjunction with the illustrative embodiment in the accompanying drawing.

BRIEF DESCRIPTION OF THE DRAWING

The sole FIGURE is a block diagram of the radar target identification apparatus according to the present invention.

DESCRIPTION OF THE PREFERRED EMBODIMENT

The present invention provides a means of quiet identification that is a secure technique for tagging friendly aircraft, ships, satellites, and other objects so they may be readily identified in a dense hostile environment. This means is accomplished by a small, low-power device which is carried in the friendly vehicle and adds a two-dimensional range and cross range Doppler coded return to the vehicle's skin return when it is interrogated and illuminated by a friendly radar that has the proper bandwidth and waveform characteristics. In order to provide increased security, still further coding techniques may be employed to aid in discriminating the quiet identification return from the airframe return.

The radar target identification apparatus utilizes the same coherent wideband radar imaging technology that is being utilized for the identification of noncooperative aircraft at long ranges. The addition of the radar target identification apparatus to a friendly aircraft's defensive systems inventory reduces the processing load on an imaging based identification system by presorting the aircraft that are present within the imaging radar's field of view. Unlike the currently used identification-friend or foe (IFF) systems, however, the radar target identification apparatus produces a response which is contained within the image/Doppler window of the aircraft skin return and is at the same frequency as the illuminating radar. The two-dimensional target identification response pattern provides a large number ($>10^9$) of code combinations for vehicle identification, mission, armaments, and other information. The response code is easily changed through replacable fixed memory circuits or through the use of a programmable volatile memory.

The security level of the present radar target identification apparatus may be substantially increased by utilizing other secured methods that are presently available. The use of the current identification friend or foe interrogation system to enable the radar target identification apparatus and to specify part or all of the response pattern, provides ground verification of the radar target identification apparatus code. The conventional identification, friend or foe response from the aircraft would not be used, thereby protecting the aircraft to exposure to enemy interception. Furthermore, the addition of phase or waveform coding to the radar target identification apparatus response, inhibits detection by the enemy even if it possesses a radar imaging capability. The same type of coding techniques provides a method of enhancing the radar target identification apparatus's return, compared to the aircraft return, when the response is properly decoded. A combination of identification, friend or foe control and multilevel coding provides the maximum security from enemy duplication of the radar target identification apparatus response even if the enemy possesses a copy of the equipment.

Referring now to the FIG. 1, there is shown a radar target identification apparatus utilizing an antenna 10 to receive the radar signal from a friendly coherent wideband imaging radar unit. The radar signal is applied to the input port 11 of a microwave circulator 12. The output port 13 of the circulator 12 is connected to the input port 14 of a double balanced mixer unit 15 wherein the radar signal is converted to a lower frequency by being mixed with the carrier signal from the local oscillator 21 that is applied to the mixer second input port 16. The converted signal from the mixer unit 15 appears at the mixer output port 17 which is connected to filter unit 18. The lower sideband signal is filtered in filter unit 18 and is amplified in amplifier unit 19. The output of amplifier 19 is connected to the input port 20 of a balanced modulator 22. A pseudo-random digital code from the phase encoder 29 is applied to the code input 24 to bi-phase modulate the lower sideband signal. The output signal from the modulator 22 appears at the output port 25 and is coupled to a tapped delay line unit 26. The desired delayed outputs are selected by the switch matrix unit 27 in accordance with a code that is generated in the delay encoder unit 30. The selected outputs are individually cross range coded by the Doppler modulators 32 according to the frequencies that are generated in the Doppler encoder 31. The outputs from the Doppler modulators 32 are applied to the summing unit 33 wherein the signals are summed and applied to amplified unit 34. The delayed, modulated signals are amplified in amplifier unit 34 and then coupled to the input 35 of a second mixer 36.

An identification friend or for (IFF) code which is transmitted by the friendly surveillance radar to the illuminated vehicel, is received at point 37 and applied to the decoder and control unit 38 on board the vehicle. A decoder and control circuit 38 is used to set the proper friendly vehicle response coding which is based on a decoded Identification friend or foe (IFF) interrogation signal that was received by the friendly vehicle at point 37. Depending on the waveform code that is received at the decoder and control unit 38, the local oscillator 21 will produce signals at its two outputs that are applied respectively to input port 16 of mixer 15 and input port 41 of mixer 36. The output port 39 of the second mixer unit 36 will have the same or an inverted spectrum as compared to the original input waveform at the input port 14 of mixer unit 15. A detector unit 40 samples and detects the output signal from port 39 of mixer unit 36 which is used by the PRF detector unit 40 to synchronize the phase and Doppler signals to the radar pulse repetition frequency. The output from the PRF detector unit 40 is connected to the third port 42 of the circulator unit 12 for transmission through the antenna 10 to the interrogating surveillance radar. The friendly vehicle has thus responded to the radar's interrogation and provide the response that identifies it as friendly in a dense hostile environment.

Although the invention has been described with reference to a particular embodiment, it will be understood to those skilled in the art that the invention is capable of a variety of alternative embodiments within the spirit and scope of the appended claims.

What is claimed is:

1. A radar target identification apparatus comprising in combination:

a radar signal receiving means receiving a wideband coherent radar signal from an interrogating radar, said receiving means mixing said radar signal with a local oscillator signal to provide a lower frequency, said receiver means filtering and amplifying said lower frequency to provide a lower sideband frequency, a modulator means connected to said receiving means to receive said lower sideband frequency, said modulator means receiving a digital code, said modulator bi-phase modulating said lower sideband frequency to provide a modulated signal output, a tapped delay line connected to said modulator means, said delay line providing a plurality of delayed outputs, a switch matrix connected to said tapped delay line to receive said plurality of delayed outputs, said switch matrix receiving a delay code, said switch matrix providing selected outputs, a Doppler modulator connected to said switch matrix to receive said selected outputs, said Doppler modulator receiving a Doppler code, said Doppler modulator individually cross range coding said selected outputs providing a plurality of multi-level outputs, a summing unit connected to said Doppler modulator to receive said plurality of multi-level outputs, said summing unit combining said plurality of multi-level outputs to provide an output signal, an amplifier means connected to said summing unit to receive said output signal, said amplifier means amplifying said output signal to provide an amplified output, a decode and control means to receive an identification code, said decode and control means generating said digital code, said delay code and said Doppler code in response to said identification code, said decode and control means generating a waveform code, said decode and control means applying said waveform code to said receiver means, a mixer means connected to said amplifier means to receive said amplified signal, said mixer means receiving a mixer signal from said receiver means, said mixer means mixing said amplifier signal with said mixing signal to provide a response signal, said response signal having substantially the same spectrum as said radar signal, said response signal being applied to said receiver means to transmit said response to said interrogating radar.

2. A radar target identification apparatus as described in claim 1 wherein said receiving means comprises in combination:

an antenna to receive said radar signal, a circulator means having a first, second and third port, said first port connected to said antenna, a mixer unit having a first and second input and an output, said first input being connected to said second port of said circulator means, a local oscillator providing an oscillator signal, said oscillator signal being applied to second input port of said mixer unit, and, a filter amplifier unit connected to said output of said mixer unit to receive said radar signal therefrom.

3. A radar target identification apparatus as described in claim 1 further including a pulse rate frequency detector, said pulse rate frequency detector connected to the output of said mixer means, said pulse rate frequency detector providing a PRF signal to said decode and control unit, said decode and control unit varies said waveform code to synchronize said response signal to the pulse rate frequency of said radar signal, said pulse rate frequency detector connected to said third port of said circulator to apply said response signal to said antenna.

4. A radar target identification apparatus as described in claim 1 wherein said digital code comprises a phase code.

5. A radar target identification apparatus as described in claim 1 wherein said digital code comprises a pseudo-random phase code.

* * * * *